A. S. KEAGY.
HARROW AND FIELD ROLLER.

No. 112,149. Patented Feb. 28, 1871.

Witnesses:
Chas. P. Housum
Roth B. Mohegan

Inventor:
Abraham S. Keagy

United States Patent Office.

ABRAHAM S. KEAGY, OF HARRISTOWN, ILLINOIS.

Letters Patent No. 112,149, dated February 28, 1871.

IMPROVEMENT IN HARROWS AND FIELD-ROLLERS.

The Schedule referred to in these Letters Patent and making part of the same.

I, ABRAHAM S. KEAGY, of Harristown, in the county of Macon and State of Illinois, have invented certain Improvements in Sectional Revolving-Harrow and Field-Roller combined, of which the following is a specification.

Nature and Objects of the Invention.

My invention relates to a combination of sectional revolving-harrows and field-rollers, and consists mainly in the construction and novel arrangement of devices whereby a number of revolving harrows and field-rollers are combined in the same machine, and arranged to operate independently of each other. Also, the manner in which the teeth in the revolving harrows are kept from clogging in heavy ground by teeth in that portion of the horizontal frame in rear of the revolving harrows, and the manner in which the frame of the rollers is attached to the frame of the harrows so as to give the frame an upward-and-downward motion.

Description of the Accompanying Drawing.

Figure 1:
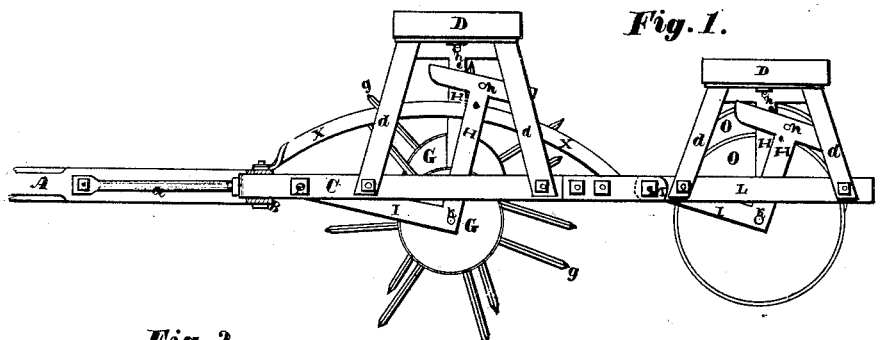
Figure 2:
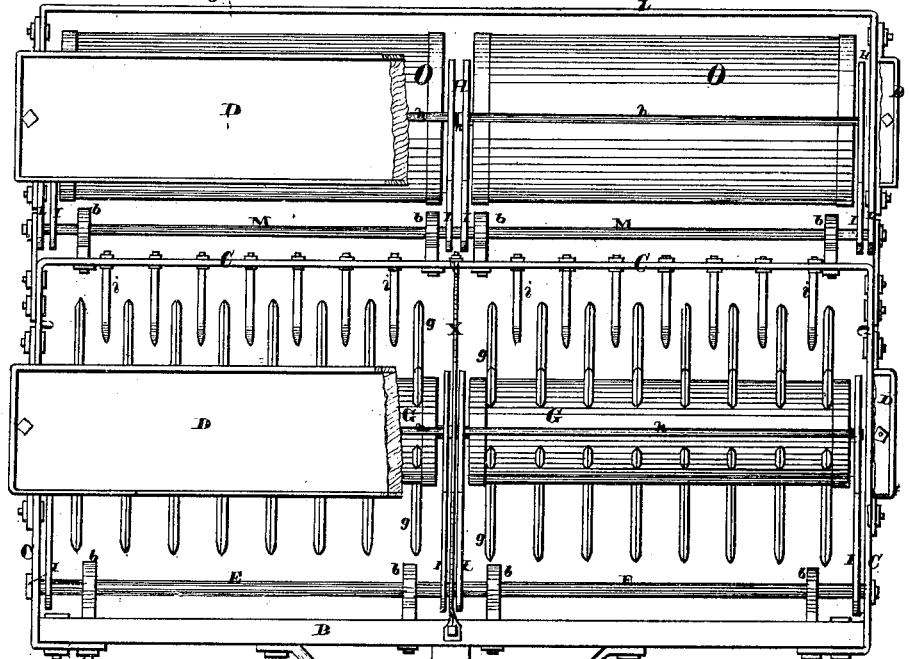
Figure 3:
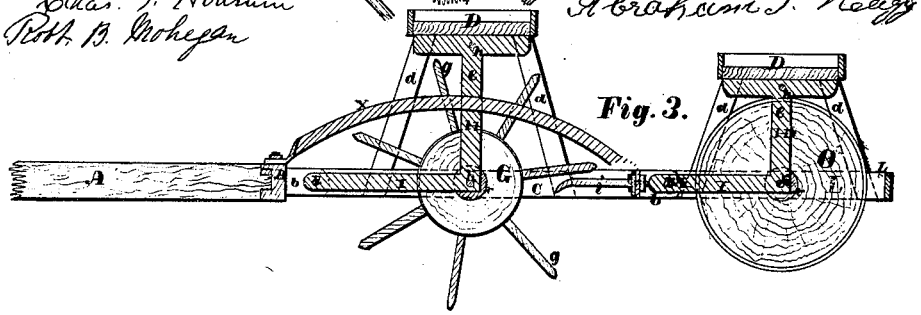

Figure 1 is a side elevation of a machine embodying my invention.
Figure 2 is a plan of the same.
Figure 3 is a vertical section thereof.

General Description.

A is the pole of the carriage.

B, the transverse beam, to which it is secured by tenon and mortise, and braced by rods $a$ $a$.

C designates the horizontal frame which passes around the harrows.

D represents a trough for conveying stones, trash, &c., out of the field, and serving, also, as a seat for the driver.

The trough is supported at each end by standards $d$ $d$. When necessary the trough may be weighted to operate on hard soil.

E is a long rod extending from one end of the carriage to the other, and secured to the sides of the frame C, and to the bearing-pieces $b$ $b$ fastened to the beam B.

G G designate the revolving harrows, which are studded with harrow-teeth $g$ $g$, and rotated by the drawing of the machine.

Each of these revolving harrows are fixed in a separate frame, composed of two side-pieces, H H, connected together by the rod $h$ at the top, and by the axle $k$ of the harrow.

The side-pieces H H are right-angled, and the axle $k$ is screwed firmly into each at the angular point.

The horizontal arms I I are pivoted to the transverse rod E, and the upright arms $e$ $e$ are expanded at their upper ends and abut under the seat or trough D, thereby serving to give the harrows evenness of movement on level ground and to prevent the trough from touching them.

The rear horizontal bar of the frame C is studded with teeth $i$ $i$, curving downward, and serve to clean the teeth of the revolving harrows and to prevent them from clogging on heavy ground.

The frame C is braced with an arched bar, X, bolted on the beam B and the rear horizontal bar of the frame C.

L is a horizontal frame that passes around the rollers, and is pivoted to the frame C by means of transverse rod M passing through an extension of the frame C, horizontal frame L, and bearing-pieces $b$ $b$, said bearing-pieces being attached to the rear horizontal bar of the frame C, thus giving the frame L an upward-and-downward motion.

O O designate the rollers, which are operated in the same manner as the harrows, and for which a patent was granted to me April 5, 1870, No. 101,626.

This machine is designed to be drawn by a span of horses. Each section, being independent in its construction, does not interfere with the operation of the others; and thus, while one of the harrows or rollers may be passing over a large clod, stone, or other obstruction, the others will continue to operate on the level ground or in any depression thereof.

The machine is easily turned, as in this operation the other harrow and roller can reverse their motion.

The harrows can be removed and the rollers substituted when it is desired to use the machine as a roller only.

The rear horizontal bar of the frame L serves as a scraper to detach the soil from the rollers.

If it be desired to remove this bar further to the rear, scrapers may be attached to it for this purpose.

The axles $k$ $k$ pass through boxes $x$ $x$ in the harrows and rollers, thereby securing strength and uniformity of work.

The whole machine can be taken to pieces and readily boxed for transportation.

Claims.

I claim as my invention—

1. The revolving harrow herein described, consisting of the sectional revolving harrows G G, arranged to move abreast of each other, but each having an independent upward or downward motion, as specified.

2. The revolving harrow herein described, having sectional harrows G G, turning upon independent axles $k\ k$, screwed into the independent frames H H, connected to the horizontal rod E by the arms I I, and provided with the trough or seat D, substantially as and for the purpose hereinbefore set forth.

3. The combination of the teeth $i\ i$, frame C, and harrows G G, substantially as described.

4. The combination of the rod M, frames C and L, and rollers O O, substantially as described.

ABRAHAM S. KEAGY.

Witnesses:
 CHARLES P. HOUSUM,
 ROBT. B. MOHEGAN.